2,925,450
PROCESS AND APPARATUS FOR VAPORIZING BENZENE OR LIGHT OIL

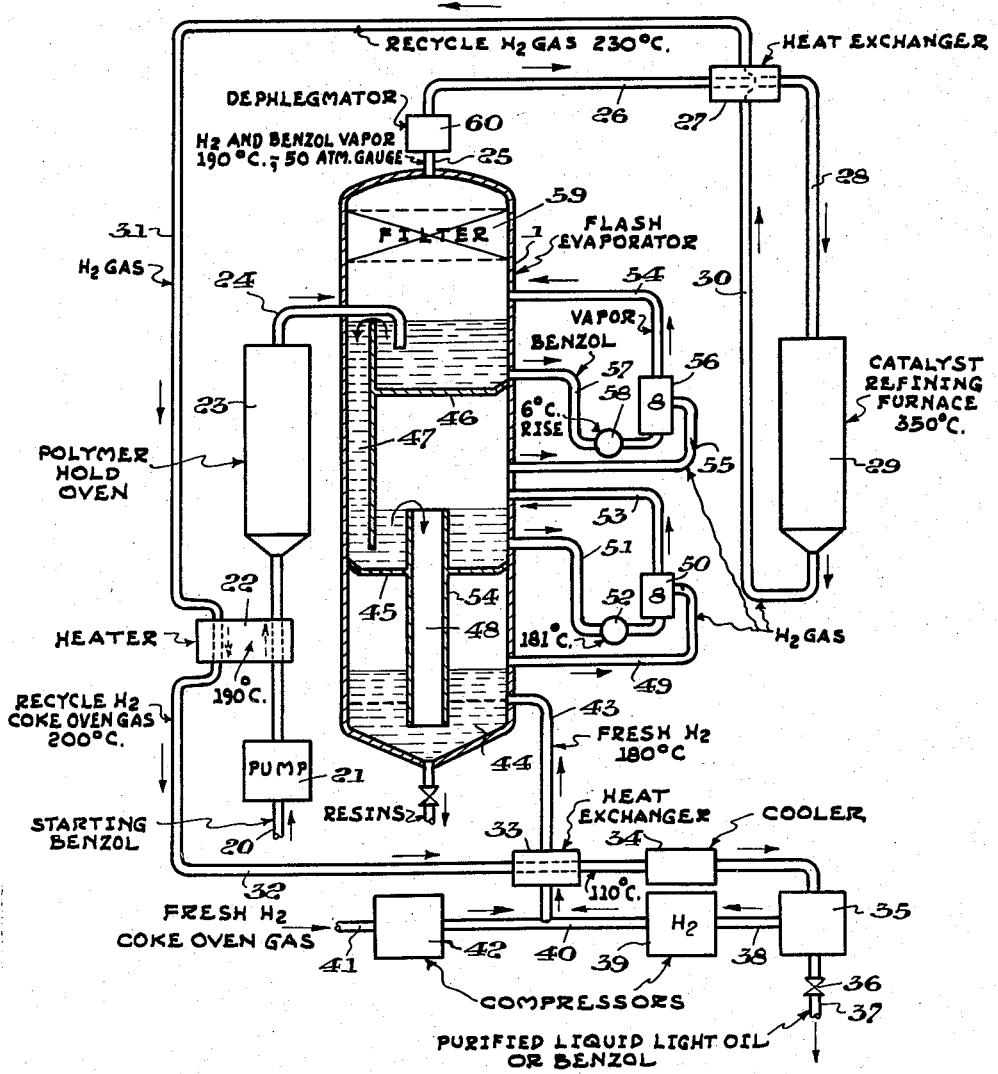

Adolf Schmalenbach and Emil Sattler, Essen, Germany, assignors, by mesne assignments, to Koppers Company, Inc., Pittsburgh, Pa., a corporation of Delaware Application March 20, 1956, Serial No. 572,665

5 Claims. (Cl. 260—674)

The present invention relates to the improvement of a process step for vaporizing and thereby separating benzene or light oil from polymerized impurities under pressure from a liquid hydrocarbon mixture which has previously been subjected to a heat treatment, likewise under pressure, in order to polymerize the resin-forming impurities contained in the initial material to form compounds boiling at higher temperature.

The invention is particularly concerned with such a process in which the vaporization takes place in the presence of recycled hot gases, more especially gases containing hydrogen, which is used in a later step of the process for catalytic refining of the benzene vapors and are saturated with the vapours of the benzene or light oil.

The present process is of particular importance in the known so-called pressure refining of crude benzene. By pressure refining of crude benzene, there is essentially understood a process in which the crude benzene vapours containing unsaturated resin-forming hydrocarbons and also sulphur, nitrogen and oxygen compounds, are treated at elevated pressure and temperature with hydrogen in the presence of suitable catalysts in order to transform the unsaturated compounds into saturated compounds and to hydrogenate the sulphur and nitrogen compounds to form hydrogen sulphide or ammonia and water vapour. After the chemical compounds freshly formed in this manner from the impurities have been separated from the starting material, a benzene is then obtained with a high degree of purity.

A very important part in the continuous operation of this pressure refining process is played by the method and manner in which the liquid crude benzene under pressure is vaporized prior to the catalytic step. The crude benzene which has been subjected to a previous heat treatment (the so-called initial polymerization) in a manner known per se contains as a result thereof a series of higher-boiling organic substances which boil in the range between about 200 and 330°. The vaporization of the crude benzene to separate it from these polymers must therefore be carried out in such manner that these polymers are not depolymerized again, because otherwise they could pass as vapours along with the other light oil vapours and the hydrogen from the evaporator into the catalytic refining furnace proper. If such resin-forming compounds pass into the catalytic refining furnace, they would spoil the catalyst and after a short time reduce its effect to such a degree that a continuous purification operation is or could not be guaranteed. Therefore, as regards the choice of temperatures which obtain in the evaporator, care must be taken that the depolymerization temperature is not exceeded.

However, even if this depolymerization temperature is not exceeded inside the evaporator, it is still nevertheless possible for certain other difficulties to result, this being due to the fact that if the heat necessary for vaporization is supplied to the liquid material indirectly, i.e. through walls, local temperature peaks can be formed on the walls and these cause formation of decomposition products which when formed are practically no longer possible to vaporize again and which are instead deposited on the walls as incrustations. The continuous operation of the catalytic refining plant can also be considerably impeded by such incrustations.

It has also already been proposed that the heat required for vaporizing the light oil should be supplied in the form of the sensible heat of a suitably preheated hydrogen gas. However, this requires a comparatively high temperature of the hydrogen gas before it is introduced into the liquid material to be vaporized. If the hydrogen-containing gas used for the catalytic refining process is normal coke-oven gas, which as is known contains resin-forming compounds in the form of nitric oxides as well as the hydrogen, a strong heating of the coke-oven gas leads to the formation of high-boiling substances (gums), which are deposited on the heater tubes for the coke-oven gas and can in time clog the said tubes.

The present invention has for its object to overcome the difficulties pointed out above. The invention consists essentially in that the liquid starting material (crude benzene) from which light oil vapours are to be evolved is supplied, as from the hold oven of Urban et al. Patent 2,701,267, without change of liquid phase to a heater and thereafter to an aspirator device which is designed in the manner of a mammoth pump and in which the hot flowing recycle hydrogen gas is intimately mixed by means of a drop in pressure with the liquid substance, with evaporation of some of the latter, and the recycle gas then returns with the evaporated liquid into the flash evaporation vessel, in which the gaseous and vaporous components are subsequently separated from the liquid phase and the gaseous and vaporous components passed overhead to the catalytic step.

This invention is based on an observation which has been made by the applicants and whch is to be hereinafter more fully explained. For the vaporization of benzene under the necessary working conditions of said known catalytic refining process it is necessary to have a predetermined amount of hydrogen-containing gas recycled to a predetermined quantity of liquid starting substance, namely, about 1500 standard cubic metres of gas to each ton of crude benzene which is treated. This recycled gas quantity is saturated in the evaporator with light oil vapours and is then supplied to the catalytic refining furnace. This gas quantity circulates through the evaporator as a multiple of the amount of crude benzene passed through the refining plant without involving a pressure loss of the gas, which plays an appreciable part in relation to the pressure required for the actual pressure refining process. It could be established that the hydrogen-containing gas required for catalytic refining a predetermined quantity of initial material, with a pressure loss of only about 0.1 atm., circulates through the flash evaporator at 20–30 times the amount of liquid which is per se to be vaporized.

If in accordance with the invention the liquid material from the hold oven that is to be flash evaporated in the evaporator is aspirated before introduction to the flash area thereof, as by means of a mammoth pump to which all the hydrogen gas quantity is admitted, and the heater which introduces into the liquid material to be vaporized that heat quantity required for vaporizing only a certain part of the starting material (crude benzene), is traversed by a quantity of this liquid which is many times greater than that which is finally to be vaporized in the evaporator. In other words, the heat required for vaporizing only a certain part of the starting material is therefore incorporated in a volume of liquid many times greater than the quantity of liquid to be vaporized. The effect of this is that the temperatures in the heater can be kept comparatively low and in the region of the temperature at which the liquid material enters the heater from the previous polymerization step. The temperature of previous initial polymerization is thus only exceeded by a few degrees centigrade, so that a subsequent depolymerization is avoided in practice.

It is then possible to operate the heater with such small temperature differences between the incoming starting liquor and the recycled evaporation liquor that, on the one hand, the formation of incrustations on the heater tubes is prevented and, on the other hand, the heat-transfer media (steam, hot water or the like) can be used at a lower temperature than heretofore.

If necessary, the heat required for vaporizing a certain fraction from the crude benzene can be supplied to the liquid material in several stages and in this case each stage will have a heater and a mammoth pump associated therewith.

Further features of the invention will be apparent from the drawings and the associated description.

Figure 3 shows a complete layout of a pressure-refining plant with a two-stage evaporator operating according to the invention.

Figure 1:
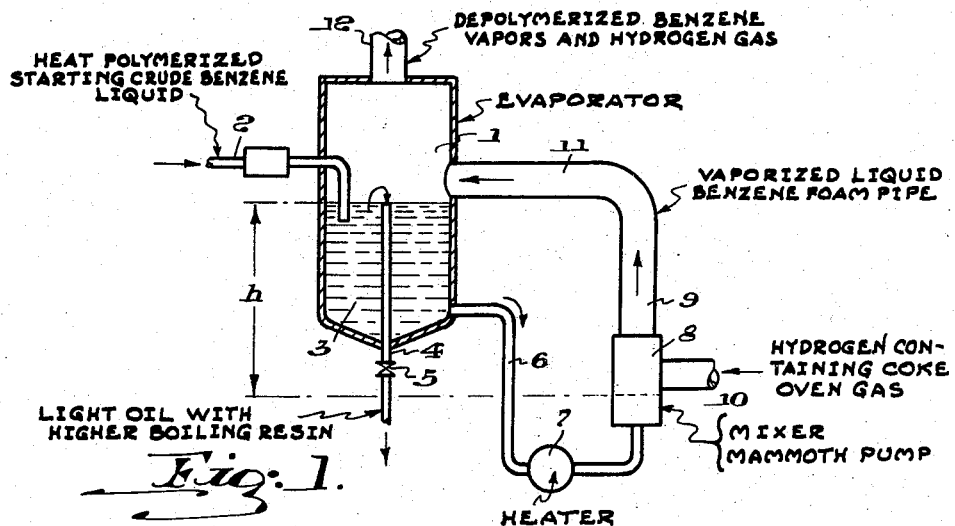
Figure 1 is a diagrammatic view showing the principle of the invention.

In Figure 1, the evaporation vessel in which the gaseous and vaporous constituents are separated from a liquid residue is indicated at 1. The crude benzene, which has been subjected beforehand to a heat treatment under pressure for the purpose of polymerizing certain resin-forming constituents, is introduced without any change in pressure through the pipe 2 into a liquid reserve 3 in the evaporator. The level of the liquid reserve 3 is determined by an overflow pipe 4. The residue of evaporation is withdrawn intermittently or continuously from the overflow pipe 4 by way of the valve 5. As well as higher-boiling compounds, this residue also contains a certain proportion of benzene which can be recovered by any suitable method known per se. Liquid material is withdrawn from the evaporator through the pipe 6 and supplied through an indirect heater 7 to a mixer 8 which, together with a subsequent foam pipe 9, forms a conveyor device operating in the manner of the mammoth pump. The hot coke oven gas-containing hydrogen is supplied through the pipe 10 to the mixer 8, is mixed therein with the liquid material and forms in the following foam pipe 9 a mixture of liquid and small gas bubbles, a quantity of light oil vapours being evaporated from the liquid, this quantity corresponding to the heat quantity incorporated in the heater 7 inclusive of the liquid. The gas containing hydrogen is saturated with the light oil vapours and as it rises through the foam pipe 9, it also entrains the liquid which is not vaporized. This liquid passes by way of the pipe 11 back to the evaporator. The liquid which has not vaporized, however, now has a different composition as regards the percentage of polymers, because it is essentially only light oil vapours as no polymers have vaporized in the mammoth pump 8—9. The polymers are therefore concentrated in the reserve 3, while a mixture of hydrogen gas and benzol vapours is withdrawn to the catalyst refining step through the pipe 12, this mixture containing practically no polymers or decomposition products of these polymers. The amount of liquid which is circulated through the pipe 6, the heater 7 and the mammoth pump 8—9 depends on the flow velocity of the hydrogen gas in the mixing nozzle 8, that is to say, it depends on the pressure drop which is permitted to the hydrogen gas. As already mentioned above, when the pressure loss of the gas is about 0.1 atm., the liquid quantity can be about 20 times the amount of liquid which is discharged in vapour form through the pipe 12. The foam pipe following the mixing nozzle 8 is also advantageous in the respect that the heat and material exchange is made to conform substantially to the condition of equilibrium, due to the gas and liquid remaining for a certain time within this pipe. The pressure difference of the gas, which is converted in the nozzle 8 into kinetic energy of the gas and is then used for conveying the circulated liquid quantity, must of course not be greater than the pressure of the liquid column which obtains between the level of the liquid reserve 3 and the level of the inlet for the liquid from pipe 6 into the mixing nozzle 8. In order that this pressure difference may be made as great as possible, the opening of the liquid into the mixing nozzle 8 is therefore arranged at such a depth below the level of the liquid reserve 3 that the gas is effective with the necessary pressure drop in the mixing nozzle 8 and the following foam pipe.

Figure 2:
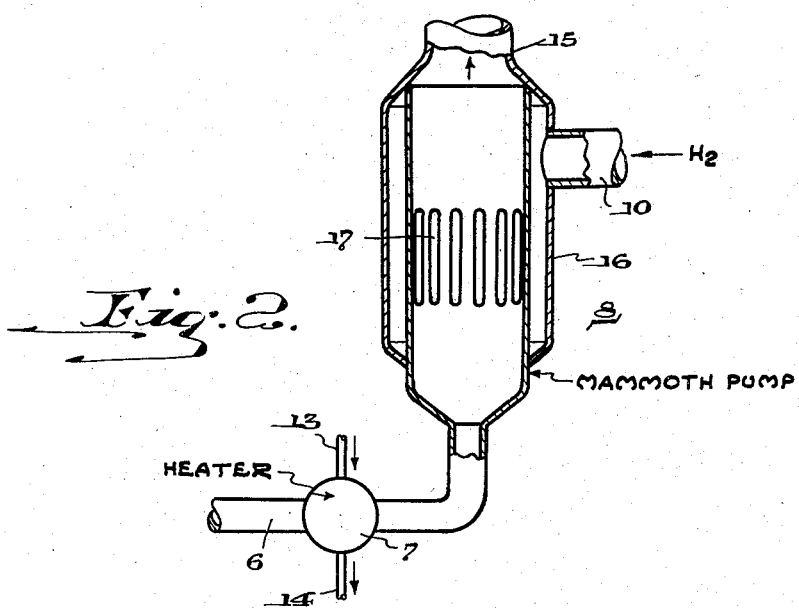
Figure 2 shows a preferred construction of the mammoth pump.

The mixing nozzle 8, is shown to a larger scale in Figure 2. The liquid material passes out from the reserve 3 in the evaporating vessel through the pipe 6 and into the heater 7 to which a heating medium is supplied through a pipe 13, the heat of said medium being transferred indidirectly to the liquid material. The heating medium leaves the heater through the pipe 14. Thereafter, the liquid material which has been heated to a certain degree, even if only with a small rise in temperature, enters the mixing nozzle 8 from below. This mammoth pump mixing nozzle consists of an inner tube 15 which is surrounded by a cylindrical jacket 16 into which the pipe 10 for the hot hydrogen gas opens above the slot openings 17 in jacket 16. These slot openings 17 are formed in the inner tube 15 in the region of the cylindrical jacket 16, the hot hydrogen gas passing through these openings into the inner tube 15 and entraining liquid material with it as it flows upwardly. A mixture of gas and liquid is then formed which, if the gas velocity is adjusted in the correct manner, ascends smoothly and without effervescence through the following foam pipe, as already described in connection with Figure 1.

The refining plant illustrated in Figure 3 is to be hereinafter described in connection with an hourly through-put of 1 ton of crude benzene. The crude benzene passes through a pipe 20 into a pressure pump 21 and from thence through a heat exchange 22 in which the crude benzene is raised to a temperature of 190° by heat exchange with hot compressed raffinate, into the polymerization furnace or hold oven 23. The crude benzene remains in the latter for a certain period of time so that the resin-forming impurities of the crude benzene can be polymerized. The liquid material then passes through a pipe 24 into the flash evaporator 1. The mixture of light oil vapours and hydrogen containing coke oven gas finally produced in the evaporator leaves the latter by way of a pipe 25 at a temperature of 190° and a pressure of 50 atm. gauge. It passes through a pipe 26, through the heat exchanger 27 and a pipe 28 into the catalyst refining furnace 29 proper, in which the hydrogenation of the sulphur, oxygen and nitrogen compounds and saturation of the unsaturated organic compounds take place at a temperature of 350°. The hot mixture of gas and vapours leaves by way of the pipe 30, gives off such an amount of heat in the heat exchanger 27 that its temperature is still 230° and passes by way of a pipe 31 into the heat exchanger 22, in which its temperature is lowered to 200°. The mixture of gas and vapours thereafter flows through a pipe 32 into the heat exchanger 33, in which it gives off more heat to the hydrogen-containing gas to be supplied to the evaporator. The mixture of gas and vapours finally passes at a temperature of 110° into the cooler 34, in which it is cooled to such a degree that the purified light oil is obtained in liquid form, this liquid thereafter accumulating in the collecting vessel 35 from which it can be withdrawn through a pipe 37 by way of a valve 36. The hydrogen gas not used up during the refining process in the furnace 29 travels by way of a pipe 38 into a compressor 39, in which the loss of pressure which it has experienced during its travel through the catalyst refining plant is made up again. This return $H_2$ gas flows through a pipe 40 together with fresh hydrogen containing coke oven gas which is introduced into the process by a pipe 41 and by way of the compressor 42, the mixture then passing through the heat exchanger 33 and pipe 43 into the sump 44 of the evaporator 1. If the gas used as fresh gas is one showing a tendency to resinify, for example coke-oven gas, this gas is only combined with the return gas in line 40 immediately ahead of the evaporator 1, so that the rise in temperature thereof in 44 takes place in the presence of still liquid benzene. The resin-forming substances in the fresh coke-oven gas are in this way washed out in such manner that they are not able to cause any interference. The evaporating vessel has two partitions 45 and 46, which are in communication with one another and with the sump 44 by way of liquid columns 47 and 48. The mixture of fresh gas and recycling gas flowing from the pipe 43 with a temperature in the region of 180° into the evaporator leaves the latter again by way of the pipe 49 after it has vaporized some of the benzene still contained in the sump and enters a first mammoth pump 50, in which it is mixed with liquid product flowing from the partition 45 and by way of the pipe 51 through the heater 52. In the latter, the temperature of the liquid is raised by about 5 to 6 degrees to approximately 181° C. The pressure difference of the gas which is operative in the first mammoth pump 50 corresponds to the difference in level between the liquids in the sump and the partition 45. The mixture of gas, vapours and liquid flows through the pipe 53 back to the second section of the evaporator. That part of the liquid which is not vaporized runs through the return pipe 54 to the sump and is constantly or intermittently withdrawn therefrom. The hydrogen gas charged in this way with benzene hydrocarbons in the second section is again discharged from the evaporator by way of the pipe 55 and again entrains with it liquid material in the second mammoth pump 56, the said material flowing to the mammoth pump by way of the partition 46, the pipe 57 and the heater 58, in which there is again produced a rise in temperature of about 6°. The mixture of gas, vapours and liquid passes through the pipe 54 into the first uppermost stage of the evaporator 1, in which takes place the final separation of the gaseous and vaporous constituents from the liquid. That pressure difference of the gas which is operative at the second mammoth pump 56 corresponds to the difference in level between the accumulations of liquid on the partitions 45 and 46. The gas-vapour mixture continues to ascend in the first evaporator section and finally leaves the latter, as already described, by way of the pipe 25. In order to avoid droplets of liquid being entrained into the pipe 25, a bed 59 of filler bodies is arranged in the upper part of the evaporator, which bed can if necessary be sprinkled with liquid benzene which is generated in a dephlegmator 60.

We claim:

1. An improved step of hot hydrogen gas vaporization of benzene from a liquid hydrocarbon starting mixture containing crude benzene, which mixture has polymerized resin forming impurities therein, as a result of a previous step of a process by thermal pretreatment under pressure to polymerize the resin-forming impurities contained in the crude benzene mixture, for separation of the resin from the crude benzene before it enters a further step of the process in which the benzene vapor is to be catalytically refined therein with the hydrogen gas, which improved process step comprises: supplying the aforesaid liquid starting mixture from said previous step to a reserve thereof in an evaporating vessel, withdrawing a part of the liquid starting mixture from the evaporating vessel and flowing this part without change of liquid phase through a heater, thereafter aspirating said part with hot recycled hydrogen gas from the further catalytic refining step under lower pressure conditions than the pressure of the starting liquid passing to the aspirating step from the evaporating vessel to thus vaporize the starting liquid, passing the mixture of recycled hydrogen gas and vaporized liquid into the evaporating vessel at a level above the reserve of liquid therein, whereby gaseous and vaporous constituents flash from the liquid phase resin constituents of said mixture in said vessel, and flowing the so separated gaseous and vaporous constituents from the vessel to said further catalytic refining step of the process.

2. A process as claimed in claim 1, and in which the starting mixture is heated in said heater with a small rise in temperature of the order of about 6° C.

3. A process step for vaporizing crude benzene from a liquid hydrocarbon starting mixture after the mixture has been maintained at elevated temperature and pressure for a time in a previous step to complete the formation of polymers of polymerizable catalyst impurities for removal of the same prior to a step of catalyst treatment of the mixture for removal of other impurities from the crude benzene, said step comprising: adding an increment of heat successively to successive minor amounts of the starting mixture from the aforesaid previous step, recycling hydrogen gas from the aforesaid catalytic treatment step into aspirating relation with the successively heated minor amounts of mixture with the hydrogen gas at a slightly lower pressure than the liquid mixture and thereby entraining minor amounts thereof successively into the recycled hydrogen gas, passing the hydrogen gas and its entrained minor amounts of liquid mixture into a flash evaporation zone and thereby vaporizing off the crude benzene liquid from said polymers, and flowing the hydrogen gas and vaporized liquid off to said catalytic treatment step.

4. A method as claimed in claim 3, and in which the starting mixture is heated as aforesaid with a small rise in temperature of the order of 5–6° C.

5. An improved vaporizing means for removal of the polymers from liquid crude benzene before catalytic refining of the same, comprising: the combination with heating means for heating the crude benzene liquid to initiate polymerization of catalyst impurities, a hold oven for temporarily holding the heated liquid for completion of the polymer formation, and a catalytic refining apparatus for catalytically refining the crude liquid benzene with hydrogen gas; of a flash evaporator vessel for flashing the crude benzene off from the polymers having a gas outlet for off flow to the catalyst apparatus of hydrogen gas containing the flash evaporated benzene, a starting liquid feed pipe for introducing liquid benzene from the hold oven into the vessel at a level below the gas outlet, an overflow polymer liquid outlet from the vessel at a level above the liquid inlet, a liquid outlet conduit leading from the vessel at a level below both said levels; means for heating liquid flowing through said lower liquid outlet, a hydrogen gas recycle line conduit for recycling hydrogen gas from the catalyst apparatus to the flash evaporator vessel, a mammoth pump conduit of greater cross-sectional area than that of the recycle line conduit and that of the liquid outlet conduit communicably connecting tangentially with said hydrogen gas recycle line conduit and axially with said liquid outlet conduit, and conduit of greater cross-sectional area than said recycle line and liquid outlet conduits and of smaller cross-sectional area than a flash evaporation chamber area of the flash evaporator area between the level of said gas outlet therefrom and the level of said overflow liquid outlet from the vessel, said conduit communicating axially with said mammoth pump conduit and discharging into said flash evaporation chamber area.

References Cited in the file of this patent

UNITED STATES PATENTS

| 1,333,328 | Martin | Mar. 9, 1920 |
| 2,560,073 | Bloomer | July 10, 1951 |
| 2,701,267 | Urban et al. | Feb. 1, 1955 |

FOREIGN PATENTS

| 668,303 | France | July 8, 1929 |